Aug. 29, 1933. J. SCHÜFFLER 1,924,200
FURNACE FOR SMELTING ALUMINIUM
Filed Dec. 30, 1931
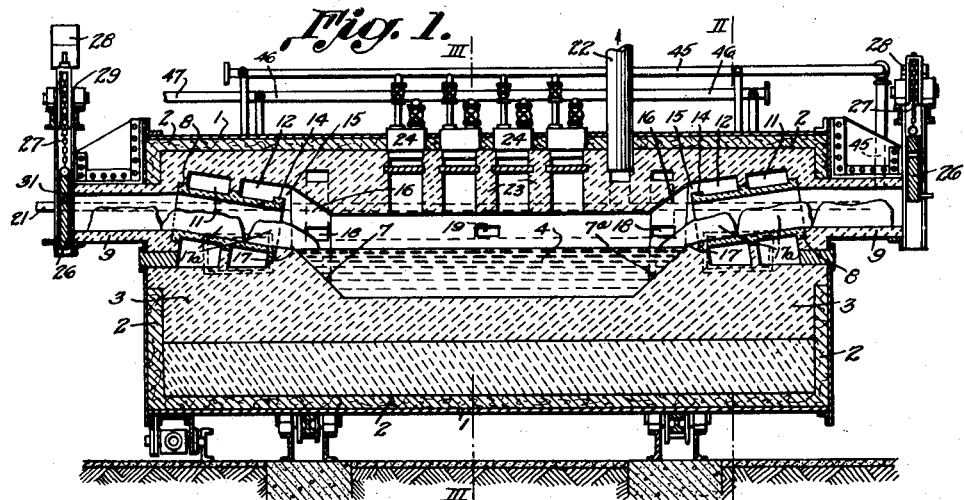
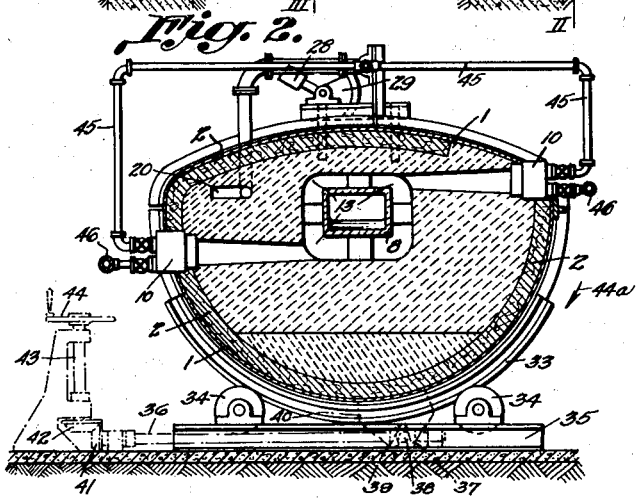
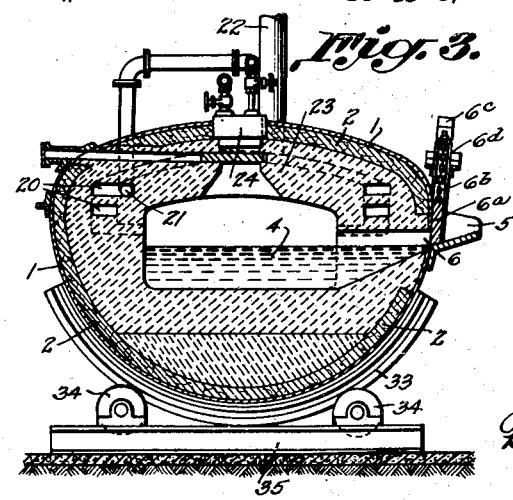
Inventor:
Julius Schüffler
By Henry Love Clarke
Atty.

Patented Aug. 29, 1933

1,924,200

UNITED STATES PATENT OFFICE 1,924,200

FURNACE FOR SMELTING ALUMINIUM

Julius Schüffler, Essen-Ruhr, Germany, assignor, by mesne assignments, to The Koppers Company of Delaware, Pittsburgh, Pa., a Corporation of Delaware Application December 30, 1931, Serial No. 583,873, and in Germany January 5, 1931

11 Claims. (Cl. 266—33)

This invention relates to the smelting of aluminium, aluminium alloys and other light metals of similar characteristics in gas-heated furnaces, and more particularly to gas-heated smelting furnaces of the type which are provided with a chamber for preheating the metal entering into the smelting chamber or hearth of the furnace.

In the known metal smelting furnaces of the type referred to, as used for instance for smelting copper, brass and similar heavy metal alloys, the hot gases issuing from the gas burner are first passed over the liquid metal and then brought into contact with the cold metal which has been introduced into the preheating chamber of the furnace. In accordance with the path of the gases relative to the path of the metal in the hearth, this type of heating may be referred to as counter-current heating.

For smelting aluminium, aluminium alloys and other light metals of similar characteristics, the method above described is extraordinarily disadvantageous, in so far as the high degree of latent heat of fusion of the light metals renders it practically impossible to avoid heating the liquid metal bath above the optimum casting temperature. Apart from the increased oxidation which involves considerable loss of metal any superheating leads to a very considerable absorption of gas in the metal. The gas dissolved in the liquid metal at high temperatures only escapes very slowly from the metal when the latter cools down and solidifies. Consequently the cast blocks formed of superheated metal usually contain a number or more or less large gas bubbles which make it impossible to form compact homogeneous plates from such blocks.

The special properties of aluminium, aluminium alloys and other light metals of similar nature render the employment of the smelting furnaces ordinarily used for dealing with copper, brass and other metals quite irrational for smelting light metals. Light metals have quite different physical characteristics from the heavy metals, a fact which hitherto has been often overlooked in the construction of furnaces for smelting light metals.

One object of my present invention is to provide a method of smelting aluminium, aluminium alloys and other light metals of similar characteristics which will enable the said light metals to be correctly smelted in accordance with the physical properties of these metals.

The method devised by me consists in first using the hot gases developed by a gas burner for preheating the metal under treatment and then passing the substantially cooled waste gases over the molten metal, the quantity of waste gases and the period of their contact with the cold solid metal being so adjusted that the liquid metal is brought exactly to the smelting temperature desired.

Preferably I do not bring the hot waste gases issuing from the gas burner directly into contact with the cold metal; I pass them first from outside against the walls of the preheating chamber, so that I first heat the cold metal indirectly and only bring the hot waste gases into contact with the solid metal for the purpose of melting it when they have cooled to a medium temperature, after which I pass the gases over the molten metal.

A further object of my invention is to provide an improved gas-heated smelting furnace to permit of carrying out the method of smelting according to the invention.

The smelting furnace according to the invention possesses, beside or above the vat or trough which receives the molten metal, a chamber for preheating the cold metal, in the adjacency of which gas burners are disposed whose waste gases are first used for preheating the metal contained in the preheating chamber and are then passed over the molten metal contained in the smelting trough.

In the furnace according to the invention the preheating chamber consists preferably of one or more muffles heated externally by burners and flowed over by the hot gases. These muffles open into the smelting trough which is also connected with the gas flues or channels provided on the outside of the muffles, so that after giving up the greater part of their heat to the walls of the muffles and the adjacent brickwork of the furnace, the hot gases can be passed over the liquid metal before flowing away into the gas discharge flue emerging from the smelting trough.

The improvements in the smelting of aluminium, aluminium alloys and other light metals of similar nature which are herein set forth take account above all of the fact that a very considerable amount of heat must be supplied to the solid metal for the purpose of converting it into the liquid state, whereas the amount of heat required for keeping the molten metal in the liquid state is relatively small. Moreover in the furnace according to the invention the gases do not come into contact with the molten metal directly they have left the burner, i. e. with their highest temperature, but only act either directly or indirectly on the cold solid metal to which they give up the greatest part of their heat and are brought thereby to such a temperature that when subsequently brought into contact with the molten metal they cannot superheat the latter.

By means of the present invention in smelting aluminium, aluminium alloys and other light metals of similar characteristics a reduction in oxidation losses and in the absorption of gas in the liquid metal is obtained, while at the same time a high thermal efficiency of the furnace is obtained. The latter point is due to the fact that the burners used for heating the furnaces can be allowed to work up to a very high temperature.

A further important feature of the aluminium smelting furnace invented by me consists in the fact that the floor of the preheating muffle is extended so far in the direction of the smelting trough that the waste gases entering into the smelting trough over the upper edge of the muffle meet the upper part of the solid metal blocks which are situated at the exit of the muffle. Consequently the heat contained in the waste gases is utilized directly for converting the metal into the liquid state without possibly being able to cause the liquid metal to become superheated.

The final object of my invention is to provide an improved construction of smelting furnace for carrying out the method according to the invention.

According to my invention I arrange the smelting trough and the preheating muffles in an approximately cylindrical housing adapted to pivot about its longitudinal axis, the preheating muffles being disposed at the end faces of the housing. This construction permits the smelting trough to be relatively long, which is advantageous in so far as the heating gases thereby remain in contact with the liquid metal for a relatively long period of time, which as is obvious enables the heat of the heating gases to be utilized fully.

I also prefer to provide in the roof of the furnace above the smelting trough one or more auxiliary burners for heating the liquid metal directly. These auxiliary burners may be shut off from the smelting trough by means of slide valves.

The provision of auxiliary burners is of advantage because it enables the liquid metal contained in the smelting trough to be kept in the liquid condition even when the heating of the muffles is arrested, and also enables the metal in the trough to be quickly reheated if it should fall below the desired temperature.

With these and other objects of my invention in view I will now describe the nature of the invention on the lines of the accompanying drawing in which:—

Figure 1 is a vertical longitudinal section through a gas-heated light metal smelting furnace constructed in accordance with the invention, Figure 2 is a cross-section along the line 2—2 of Figure 1 and Figure 3 is a vertical cross-section along the line 3—3 of Figure 1.

The furnace illustrated in the drawing consists of an approximately semi-cylindrical metal housing 1 lined with a material 2 which is a bad conductor of heat, on which the refractory material, preferably a ceramic material such as sillimanite or the like which is relatively inassailable by light metal is disposed which is used for forming the smelting trough and the heating arrangement.

In the middle of the furnace a rectangular trough 4 for receiving the molten metal is provided from which the molten metal can be drawn off through an perture 6 which is situated in one of the side walls of the oven and is provided with a spout 5. The opening 6 can be closed by means of a slide valve 6a secured by means of a chain 6b to a lever arm 6d having a counter-weight 6c. The two end walls of the metal trough 4 are bevelled off at 7 or 7a. At the upper end of each of the bevels a muffle 8 composed of a highly refractory material such as sillimanite opens into the trough 4, the muffles being accessible from outside through tubular charging chambers 9 secured to the end walls of the furnace.

The preheating muffles 8 are heated from outside by means of burners 10 disposed tangentially to the muffles. The waste gases from these burners circulate round the muffles through the flues 11 and 12 which are connected together by means of openings 13.

The waste gases flow from the flues 12 through an opening 13 provided between the upper edge 14 of the muffle and the furnace roof into the trough 4, being so diverted by means of an inclined surface 16 of a throat extending to the furnace roof that they impinge partially against the part of the solid metal 17a lying on an extension 17 of the muffle bottom.

A portion of the gases is withdrawn from the trough through the flues 18, but most of it flows over the molten metal in order to keep the latter at the desired casting temperature, and is then withdrawn through the central flues 19 into longitudinal flues 20 provided in the sides of the furnace. In one of these longitudinal flues a metal pipe 21 is disposed, through which the cold air for combustion is passed from without in order to be preheated. The heating gases are preferably withdrawn through a chimney attachment 22 provided in the furnace roof. The discharge flues of the furnace can however also be connected with a flue disposed axially to the end face of the furnace, to lead the gases to a chimney lying remote from the furnace.

In the middle of the furnace a series of burners 24 are provided in the roof 23, which can be shut off from the inerior of the furnace by means of slide valves 25 adjustable from without. These burners serve selectively, that is, according to the metal or alloy to be smelted and the temperature desired, to regulate the temperature of the liquid metal contained in the trough in order to avoid superheating the metal.

As stated the solid metal which is for instance in the form of pigs 17a is charged into the furnace through the chambers 9 provided at the end faces of the furnace. The chambers 9 can be closed in the ordinary manner by means of vertically moving sliding doors 26 which are secured by means of chains 27 to a segmental element 29 provided with a counterweight 28. The usual observation holes are provided in the sliding doors.

Combustion air is fed to the burners 10 and 24 through pipes 45 which are connected to the metal pipe 21 provided in the waste gas flue 20. The other end of the preheater pipe 21 is preferably connected with a ventilator (not shown) through the intermediary of a flexible pipe, by means of which air can be forced into the pipe 21. For the supply of heating gas the burners 10 and 24 are connected to pipes 46 to which the gas supply pipe is attached at 47 by means of a flexible pipe. As shown in the drawing, all the burners are provided with cocks for regulating the supply of air and gas.

The furnace illustrated in the drawing is constructed to tip over in order to pour out the molten metal contained in the furnace. For this purpose rails 33 are provided on the lower part of the housing which rest on rollers 34 of the base plate 35. A screw-threaded spindle 36 serves to move the furnace, and carries a flying nut 37 which engages with lateral cams 38 in a projection 40 provided with a slot 39.

The threaded spindle is rotated by means of a hand wheel 44 connected therewith by bevel wheels 41 and 42 and the intermediate shaft 43. When the hand wheel is rotated, the nut 37 moves towards the left on the spindle 36 as shown in Fig. 3, whereby the furnace is tilted in the direction of the arrow 44a according to the movement of the nut.

It may finally be mentioned that it is of advantage to provide all the waste gas flues leading from the furnace with regulating valves in order to permit the quantity of gases passing through each of the flues to be adapted to the existing conditions.

The invention as hereinabove set forth is embodied in a particular form but may be variously embodied within the scope of the claims hereinafter made.

I claim:—

1. A process for smelting aluminium, aluminium alloys or other light metals of similar characteristics, comprising bringing the hot gases formed by the combustion of a heating gas first into contact with the outer walls of a muffle consisting of refractory material in which the cold metal to be treated is contained then bringing the hot gases into contact with the solid metal preheated in the muffle, and finally bringing the hot gases into contact with the liquid metal formed by smelting the metal.

2. A furnace for smelting aluminium, aluminium alloys or other light metal of similar characteristics, comprising a smelting trough, gas discharge flues starting from the space above the same, a muffle for preheating the metal to be smelted so disposed near the smelting trough that the metal can flow from the preheating muffle into the smelting trough, burners for the combustion of a gas so disposed that the hot waste gases of same after coming into contact with the outer surfaces of the muffle come first into contact with the solid metal contained in the preheating chamber and are then passed over the liquid metal contained in the smelting trough.

3. A furnace according to claim 2 wherein a number of muffles for preheating the metal to be treated are provided, with separate gas burners for each muffle chamber.

4. A furnace for smelting aluminium, aluminium alloys or other light metals of similar characteristics, comprising a smelting trough, gas discharge flues starting from a space above the same, a muffle composed of refractory material disposed near the smelting trough and so arranged that the cold metal to be treated can be introduced therein, said muffle so disposed relative to the smelting trough that the metal can flow from the muffle into the smelting trough, burners for the combustion of a gas so arranged that the hot waste gases of same come first into contact with the outer surfaces of the muffle, then with the solid metal situated at the outlet of the muffle and are finally passed over the liquid metal contained in the smelting trough.

5. A furnace according to claim 4 wherein a number of muffles are provided with separate gas burners for each muffle.

6. A furnace as set forth in claim 4 wherein the bottom of the muffle is extended towards the smelting trough and openings are provided above this extension leading to the flues surrounding the muffle, said openings so arranged that the hot gases flowing from the openings impinge against the metal lying on the extension of the floor of the muffle.

7. A furnace as set forth in claim 4 wherein the bottom of the preheating chamber or muffle is inclined towards a smelting trough and terminates on a level with the upper edge of the smelting trough.

8. A furnace for smelting aluminium, aluminium alloys or other light metals of similar characteristics comprising a smelting trough, gas discharge flues starting from a space above the same, pipes arranged in the gas discharge flues for the passage of the cold combustion air for the purpose of preheating same, said pipes connected with the gas burners of the furnace, a muffle chamber for the metal to be smelted so disposed near the smelting trough that the metal can flow from the muffle chamber into the smelting trough, burners for the combustion of a gas so disposed that the hot waste gases of same first come into contact with the outer surfaces of the muffle, then the solid metal contained in the preheating chamber and are thereafter passed over the liquid metal contained in the smelting trough.

9. A furnace for smelting aluminium, aluminium alloys or other light metals of similar characteristics, comprising an approximately cylindrical housing rotatable about its longitudinal axis, a trough for receiving the molten metal disposed in the housing, the wall of said trough provided with an opening through which the liquid metal can flow out when the furnace is rotated, a muffle for preheating the solid metal provided at each of the side ends of the furnace, said muffle surrounded on the outside by flues which open into the smelting trough above the end of the muffle, gas burners so disposed that the hot waste gases of same flow into the flues surrounding the muffle and waste gas flues emerging from the smelting trough.

10. A furnace as set forth in claim 9 wherein gas burners are so disposed in the roof of the furnace above the smelting trough that their waste gases come directly into contact with the liquid metal.

11. A furnace according to claim 9 wherein slide valves are provided in order to shut off burners disposed in the roof of the furnace from the interior of the smelting trough.

JULIUS SCHÜFFLER.